(12) United States Patent
Kloeppel et al.

(10) Patent No.: US 6,927,515 B2
(45) Date of Patent: Aug. 9, 2005

(54) DYNAMIC TILT LIMITER FOR FLUID DYNAMIC BEARINGS

(75) Inventors: Klaus Kloeppel, Watsonville, CA (US); Mohammad Mahbubul Ameen, Campbell, CA (US); Raquib Uddin Khan, Pleasanton, CA (US)

(73) Assignee: Seagate Technology, LLC, Scotts Valley, CA (US)

( * ) Notice: Subject to any disclaimer, the term of this patent is extended or adjusted under 35 U.S.C. 154(b) by 146 days.

(21) Appl. No.: 10/427,845

(22) Filed: May 1, 2003

(65) Prior Publication Data

US 2004/0012287 A1 Jan. 22, 2004

Related U.S. Application Data

(60) Provisional application No. 60/396,760, filed on Jul. 17, 2002.

(51) Int. Cl.[7] .................................................. H02K 5/16
(52) U.S. Cl. ........................ 310/90; 310/67 R; 384/100
(58) Field of Search ................................ 310/90, 67 R; 384/107, 100

(56) References Cited

U.S. PATENT DOCUMENTS

| | | | |
|---|---|---|---|
| 5,366,298 A | * 11/1994 | Toshimitsu et al. | ......... 384/107 |
| 5,579,188 A | 11/1996 | Dunfield et al. | ......... 360/99.08 |
| 5,590,003 A | 12/1996 | Dunfield et al. | ......... 360/98.07 |
| 5,678,929 A | * 10/1997 | Parsoneault et al. | ......... 384/112 |
| 5,977,674 A | 11/1999 | Leuthold et al. | ............... 310/90 |
| 5,993,066 A | 11/1999 | Leuthold et al. | ............ 384/113 |
| 6,004,036 A | 12/1999 | Kloeppel et al. | ............ 384/107 |
| 6,649,682 B1 | * 11/2003 | Breton et al. | ................ 524/404 |
| 6,664,685 B2 | * 12/2003 | Ameen et al. | ................ 310/90 |
| 6,722,785 B1 | * 4/2004 | Ikeo et al. | ................... 384/112 |
| 6,734,590 B2 | * 5/2004 | Obara et al. | ................... 310/90 |

* cited by examiner

*Primary Examiner*—Dang Le
(74) *Attorney, Agent, or Firm*—Morrison & Foerster LLP

(57) ABSTRACT

A disc drive data storage system includes a hydrodynamic bearing including a housing having a central axis, a stationary member that is fixed with respect to the housing and coaxial with the central axis, and a rotatable member that is rotatable about the central axis with respect to the stationary member. A hydrodynamic bearing interconnects the stationary member and the rotatable member. At least a portion of a surface of one or more of the hydrodynamic bearing components has a tilt-limiting layer formed thereon to restrict the tilting distance between the working surfaces in the disc drive data storage system.

17 Claims, 3 Drawing Sheets

DYNAMIC TILT LIMITER FOR FLUID DYNAMIC BEARINGS

CROSS-REFERENCE TO RELATED APPLICATIONS

This application claims benefit of U.S. provisional patent application Ser. No. 60/396,760, filed Jul. 17, 2002, which is herein incorporated by reference.

BACKGROUND OF THE INVENTION

1. Field of the Invention

The present invention relates to the field of fluid dynamic bearing assemblies of the type that cooperate with high-speed spindle elements. More specifically, the invention relates to restricting the tilting distance between rotating and stationary members of bearing assemblies utilized in a disc drive system.

2. Description of the Related Art

Disc drive memory systems have been used in computers for many years for the storage of digital information. Digital information is recorded on concentric memory tracks of a magnetic disc medium in the form of magnetic transitions within the medium. The discs themselves are rotatably mounted on a spindle. The information is accessed by means of read/write heads generally located on a pivoting arm that moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside a hub that supports the discs. One type of motor in common use is known as an in-hub or in-spindle motor. Such in-spindle motors typically have a spindle mounted by means of two ball or hydrodynamic bearing systems to a motor shaft disposed in the center of the hub. Generally, such motors include a stator comprising a plurality of teeth arranged in a circle. Each of the teeth support a plurality of coils or windings that may be sequentially energized to polarize the stator. A plurality of permanent magnets are disposed in alternating polarity adjacent the stators. As the coils disposed on the stators are sequentially energized in alternating polarity, the magnetic attraction and repulsion of each stator to the adjacent magnets cause the spindle to rotate, thereby rotating the disc and passing the information storage tracks beneath the head.

The use of hydrodynamic bearing assemblies in such drive systems has become preferred due to desirable reductions in drive size and noise generation as compared to conventional ball bearing drive systems. In hydrodynamic bearings, a lubricating fluid, such as oil or air, functions as the bearing surface between a stationary base or housing and a rotating spindle or hub. The lubricating fluid requires gaps between the stationary and rotating members in order to provide the support, stiffness and lubricity required for proper bearing operation.

These gaps between the stationary and rotating members of the bearing may permit the rotating member to become tilted with respect to the stationary member. This tilting of the rotating member within the gaps may create contact points between the rotating and stationary bearing members. Such contact points may wear down the surfaces on both the rotating and stationary members at the points of contact enlarging the gap therebetween and undesirably affecting the performance of the bearing by creating particles.

Therefore, there is a need in the art for restricting the tilting distance between rotating and stationary members of bearing assemblies utilized in disc drive systems.

SUMMARY OF THE INVENTION

The disc drive data storage system of the present invention includes a hydrodynamic bearing comprising a housing having a central axis, a stationary member that is fixed with respect to the housing and coaxial with the central axis, and a rotatable member that is rotatable about the central axis with respect to the stationary member. A stator is fixed with respect to the housing. A rotor is supported by the rotatable member and is magnetically coupled to the stator. At least one data storage disc is attached to and is coaxial with the rotatable member. At least a portion of a surface of one or more of the hydrodynamic bearing components has a tilt-limiting layer formed thereon to restrict the tilting distance between the working surfaces in the disc drive data storage system.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
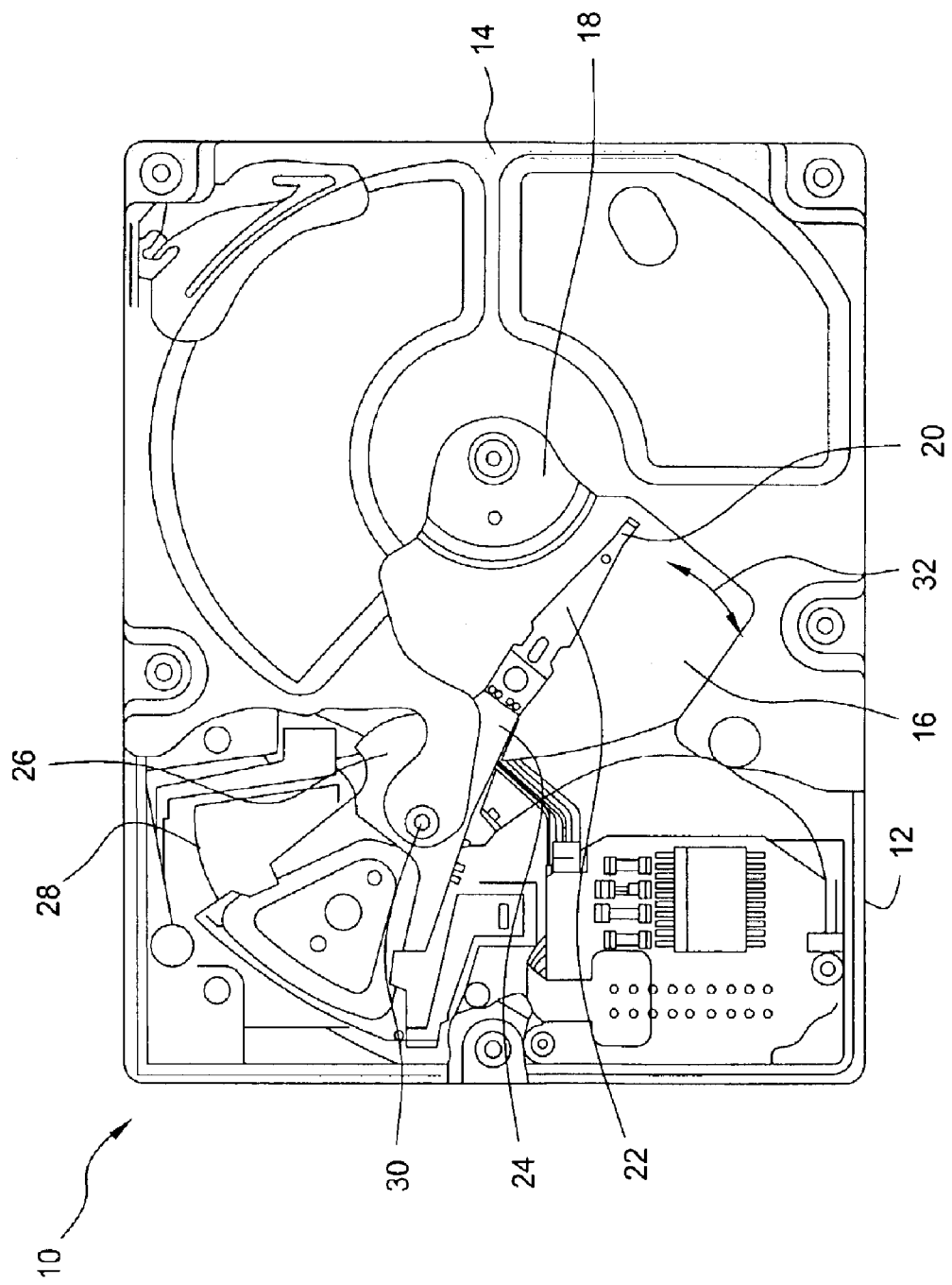
FIG. 1 is a top plan view of a disc drive data storage device in accordance with the present invention.

The present invention is a disc drive data storage device including a hydrodynamic bearing having a tilt-limiting layer thereon to restrict the tilting distance between the working surfaces thereof. FIG. 1 is a plan view of a typical disc drive 10 wherein the present invention is useful. Disc drive 10 includes a housing base 12 and a top cover 14. The housing base 12 is combined with top cover 14 to form a sealed environment to protect the internal components from contamination by elements from outside the sealed environment.

The base and top cover arrangement shown in FIG. 1 is common in the industry. However, other arrangements of the housing components have been frequently used, and the invention is not limited to the configuration of the disc drive housing shown in FIG. 1. For example, disc drives have been manufactured using a vertical split between two housing members. In such drives, that portion of the housing half that connects to the lower end of the spindle motor is analogous to base 12, while the opposite side of the housing member, that is connected to or adjacent the top of the spindle motor, is functionally the same as the top cover 14.

Disc drive 10 further includes a disc pack 16 that is mounted for rotation on a spindle motor (not shown) by a disc clamp 18. Disc pack 16 includes a plurality of individual discs that are mounted for co-rotation about a central axis. Each disc surface has an associated head 20 that is mounted to disc drive 10 for communicating with the disc surface. In the example shown in FIG. 1, heads 20 are supported by flexures 22 that are in turn attached to head mounting arms 24 of an actuator body 26. The actuator shown in FIG. 1 is of the type known as a rotary moving coil actuator and includes a voice coil motor (VCM), shown generally at 28. Voice coil motor 28 rotates actuator body 26 with its attached heads 20 about a pivot shaft 30 to position heads 20 over a desired data track along an arcuate path 32. While a rotary actuator is shown in FIG. 1, the invention is also useful in disc drives having other types of actuators, such as linear actuators.

Figure 2:
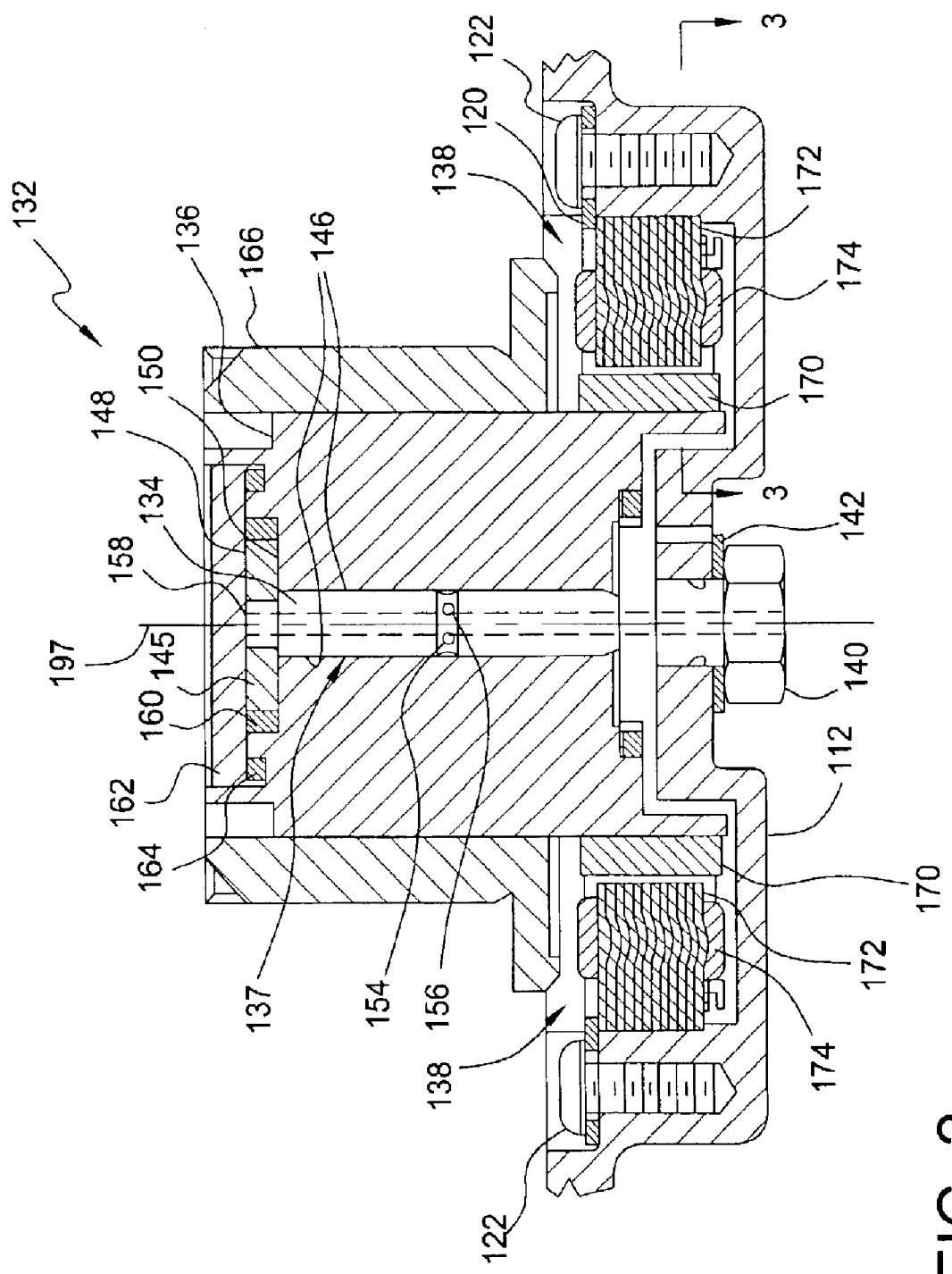
FIG. 2 is a sectional view of a hydrodynamic bearing spindle motor in accordance with the present invention.

FIG. 2 is a sectional view of a hydrodynamic bearing spindle motor 132 in one embodiment of the invention. Spindle motor 132 includes a stationary member (shaft) 134, a hub 136 and a stator 138. In the embodiment shown in FIG. 2, the shaft 134 is fixed and attached to base 112 through a nut 140 and a washer 142.

The hub 136 is supported by the shaft 134 through a hydrodynamic bearing 137 for rotation about shaft 134. The hub 136 includes a disc carrier member 166 that supports disc pack 16 (shown in FIG. 1) for rotation about shaft 134. The disc pack 16 is held on disc carrier member 166 by the disc clamp 18 (also shown in FIG. 1). A plurality of permanent magnets 170 are attached to the outer diameter of the hub 136, with the hub 136 and magnets 170 acting as a rotor for the spindle motor 132.

The stator 138 is generally formed of a stack of stator laminations 172 and associated stator windings 174. Each stator lamination 172 comprises a plurality of teeth (not shown) that extend toward a central axis 197. The plurality of phase windings 174 are wound on the stator teeth (not shown) for magnetic communication with the rotor (i.e., magnets 170 and hub 136). The stator windings 174 may have a number of winding configurations. Some examples of phase windings that may benefit from the invention are discussed in U.S. Pat. No. 5,579,188, entitled IRONLESS HYDRODYNAMIC SPINDLE MOTOR, issued Nov. 26, 1996 to Dunfield et al., and in U.S. Pat. No. 5,590,003, entitled HYDRODYNAMIC SPINDLE MOTOR HAVING DISTRIBUTED WINDINGS, issued Dec. 31, 1996 to Dunfield et al., both of which are commonly assigned and are hereby incorporated by reference in their entirety.

The stator 138 is generally retained in the base 112 by fasteners, adhesives, or other conventional methods. In the illustrated embodiment, the stator 138 is disposed in a pocket formed in the base 112. A tab 120 is fastened by a screw 122 to the base 112 and includes a portion that overlies the stator 138 thus retaining the stator 138 in the pocket of the base 112. The bearing 137 includes a radial working surface 146 and axial working surfaces 148 and 150. The shaft 134 includes fluid ports 154, 156 and 158 that supply hydrodynamic fluid 160 and assist in circulating the fluid along the working surfaces of the bearing. Generally, the hydrodynamic fluid 160 is comprised of air, light oil or other bearing lubricant.

In the embodiment shown in FIG. 2, spindle motor 132 is a "below-hub" type motor in which stator 138 has an axial position that is below hub 136. Stator 138 also has a radial position that is external to hub 136, such that stator windings 174 are secured to an inner surface (not shown) of stator laminations 172. In an alternative embodiment, the stator is positioned within the hub, as opposed to below the hub. The stator can have a radial position that is either internal to the hub or external to the hub. In addition, the spindle motor can have a fixed shaft, as shown in FIG. 2, or a rotating shaft. In a rotating shaft spindle motor, the bearing is located between the rotating shaft and an outer stationary sleeve that is coaxial with the rotating shaft.

The spindle motor 132 further includes a thrust plate 145 that forms axial working surfaces 148 and 150 of hydrodynamic bearing 137. A counter plate 162 cooperates with the working surface 148 to provide axial stability for the hydrodynamic bearing and to position the hub 136 within the spindle motor 132. An o-ring 164 is provided between the counter plate 162 and the hub 136 to seal the hydrodynamic bearing 137. The o-ring 164 prevents hydrodynamic fluid 160 from escaping between the counter plate 162 and the hub 136. If an o-ring is not used then the counter plate may be welded to the hub in order to seal the hydrodynamic bearing. Examples of hydrodynamic bearings that may benefit from the invention are described in U.S. Pat. No. 5,993,066, entitled FLUID RETENTION PRINCIPLE FOR HYDRODYNAMIC BEARINGS, issued Nov. 30, 1999 to Leuthold et al., U.S. Pat. No. 5,977,674, entitled SINGLE PLATE HYDRODYNAMIC BEARING WITH SELF-BALANCING FLUID LEVEL, issued Nov. 2, 1999 to Leuthold et al., and U.S. Pat. No. 6,004,036, entitled FLUID DYNAMIC BEARING CARTRIDGE DESIGN INCORPORATING A ROTATING SHAFT, issued Dec. 21, 1999 to Kloeppel et al., all of which are commonly assigned and are hereby incorporated by reference in their entirety. The present invention is useful with this and other forms of hydrodynamic bearings and is not limited to use with this particular configuration.

In operation, the windings are energized, causing the hub 136 to rotate. Commutation pulses applied to stator windings 174 generate a rotating magnetic field that communicates with rotor magnets 170 and cause hub 136 to rotate about central axis 197 on bearing 137. The commutation pulses are timed, polarization-selected DC current pulses that are directed to sequentially selected stator windings to drive the rotor magnet and control the speed.

The pressure created by the bearing causes the hydrodynamic fluid 160 to flow out from the ports 154, 156 and 158 towards the thrust plate 145. Generally, grooves (not shown) disposed in the shaft 134 and/or thrust plate 145 pump the hydrodynamic fluid 160 respectively between the axial working surfaces 148, 150 and the counter plate 162 and the hub 136. The pumping action builds up multiple pressure zones along the bearing 137, maintaining a fluid film between the rotating ports and providing stiffness to the bearing 137.

To effectively pump and maintain the hydrodynamic fluid 160 in the desired locations within the bearing 137, gaps defined between the working surface 148 and the counter plate 162 and the working surfaces 146, 150 and the hub 136 must be set to a tightly controlled distance. Typically, the distance or clearance of the gap is set between about 2 $\mu$m (micrometers) and about 50 $\mu$m, dependant on the motor size, hydrodynamic fluid used and operational speed. Design tolerance of the gap to ensure the desired performance is typically plus or minus 1 $\mu$m.

As described above, "tilting" of the rotating member within the gaps between the working surfaces of the hydrodynamic bearing 137 can result in failure of the disk drive 10. Tilting may create contact points between the rotating and stationary bearing members. Tilting can occur between the following surfaces: working surface 150 between the thrust plate 145 and the hub 136, working surface 148 between the thrust plate 145 and counter plate 162, as well as working surfaces 146 between the shaft 134 and the hub 136. If tilting occurs, the hydrodynamic bearing 137 can fail resulting in catastrophic failure of the disc drive system.

Figure 3:
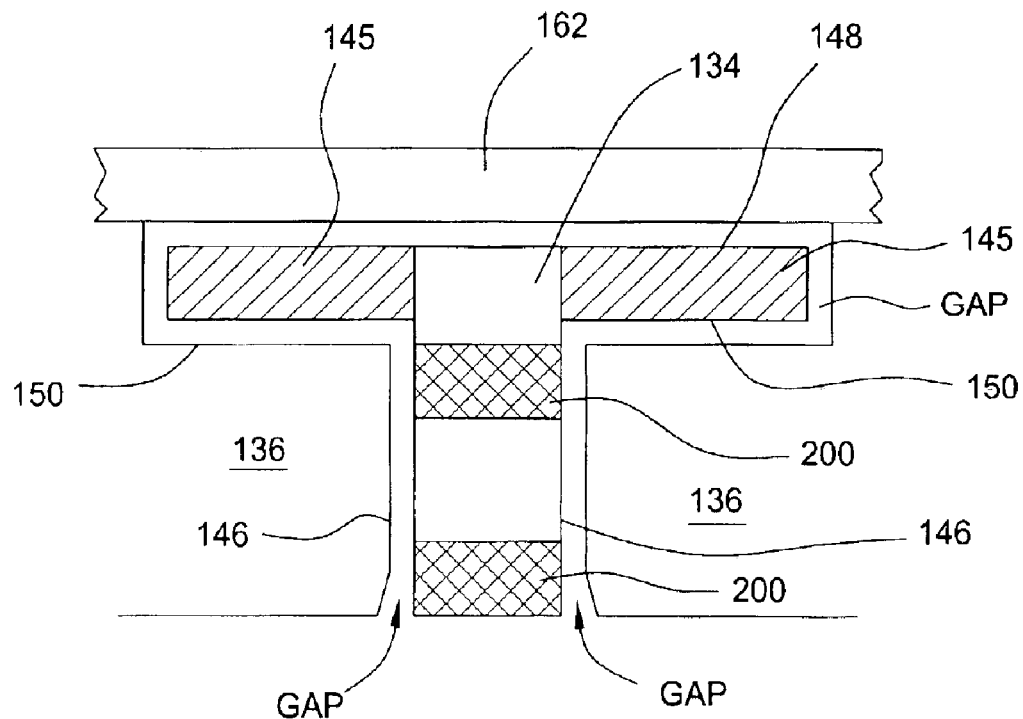
FIG. 3 is a partial sectional view of one embodiment of a hydrodynamic bearing including a tilt-limiting layer in accordance with the invention.
Figure 4:
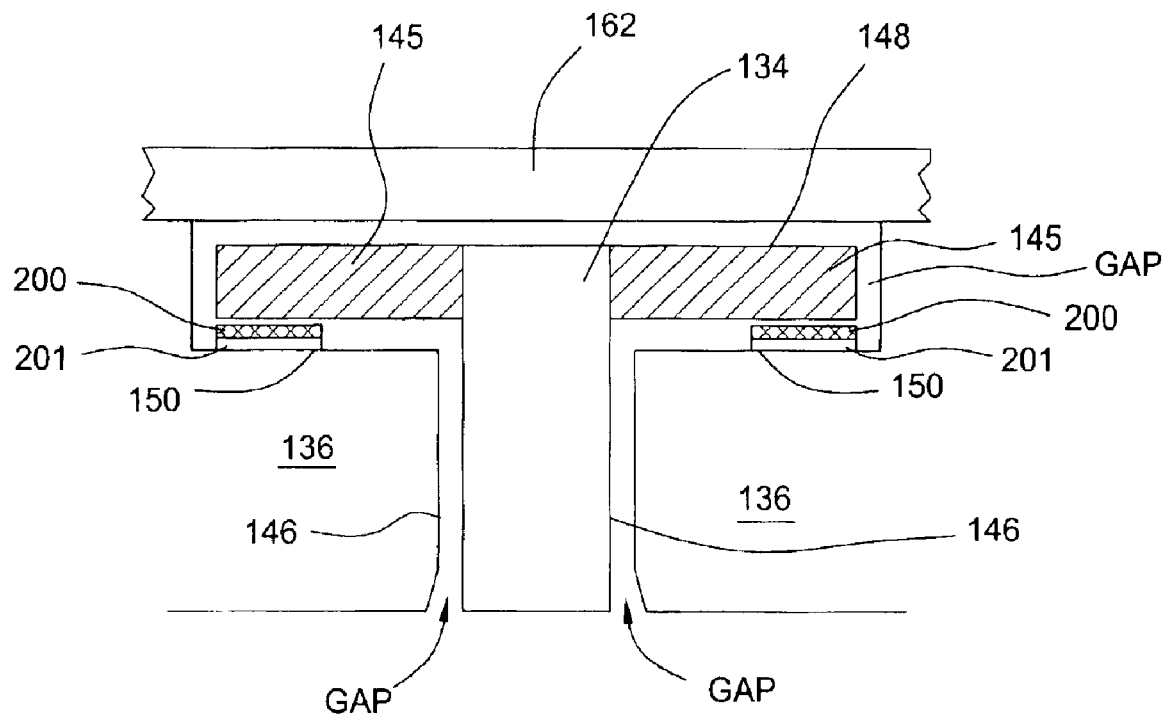
FIG. 4 is a partial sectional view of another embodiment of a hydrodynamic bearing including a tilt-limiting layer in accordance with the invention.

Referring to FIGS. 3–4 at least a portion of one of the working surfaces (radial working surfaces 146 and the axial working surfaces 148 and 150) defined by the counter plate 162, the thrust bearing 145, the shaft 134 and the hub 136 have a tilt-limiting layer 200 formed thereon. The tilt-limiting layer 200 functions to restrict the tilting distance between the working surfaces in the disc drive data storage system.

The tilt-limiting layer 200 is preferably formed in the locations of maximum rotation as well as areas where point contacts occur. In FIG. 3, for example, the tilt-limiting layer 200 is provided on working surface 146 at one or more ends of shaft 134. The tilt-limiting layer 200 reduces rotational tilt by reducing the gap between the rotating and stationary bearing members. Alternatively, in FIG. 4, the tilt limiting layer 200 may be provided on other working surfaces of the spindle motor, such as, for example, axial working surface 150 on the hub 136.

The tilt-limiting layer 200 may comprise one or more coatings of a material that improves the hardness and/or reduces the coefficient of friction of the working surfaces of the spindle motor. Suitable materials may include, for example, diamond-like-carbon, hydrogenated diamond-like-carbon, nitrogenated diamond-like-carbon, nickel phosphide (NiP), nickel boride (NiB), or combinations thereof, among other materials.

The tilt-limiting layer 200 may have a thickness sufficient to limit the tilting between the working surfaces of the spindle motor. For example, the tilt-limiting layer may typically have a thickness in the range of about 1 $\mu$m (micrometer) to about 3 $\mu$m. However, the preferred thickness for the tilt-limiting layer 200 is dependent upon factors such as the composition of the outer diameter of shaft 134, the magnitude of the gap between, for example, the shaft 134 and the hub 136, surface roughness and loading, among others.

In one embodiment, the tilt-limiting layer 200 may be deposited by physical vapor deposition (PVD), such as by a sputtering process. In another embodiment, the tilt-limiting layer 200 may be deposited by chemical vapor deposition (CVD), such as plasma enhanced chemical vapor deposition (PECVD). In another embodiment, the tilt-limiting layer 200 may be deposited by ion beam deposition. The tilt-limiting layer 200 may also be sputtered in the presence of, for example, hydrogen ($H_2$) or nitrogen ($N_2$) to enhance the frictional properties thereof.

While FIGS. 3–4 depict the tilt-limiting layer 200 as consisting of only one layer, it is within the scope of the invention for the tilt-limiting layer 200 to consist of multiple coating layers. It is often desirable for tilt-limiting layers 200 to consist of multiple layers in order to provide optimal adhesion, reduce crack propagation and to improve corrosion resistance of the shaft 134. In one embodiment, the tilt-limiting layer 200 may comprise two or more layers of diamond-like-carbon.

In one embodiment, one or more adhesive layers 201 (FIG. 4) may be deposited on portions of working surface 150 prior to depositing the tilt-limiting layer 200. The adhesive layers 201 provide improved adhesion and mechanical properties for the tilt-limiting layers to the hub 136. The adhesive layers 201 may comprise, for example, chromium (Cr), silicon (Si), titanium (Ti), zirconium (Zr), silicon carbide (SiC), as well as combinations thereof.

The thickness of the adhesive layers 201 may be in the range of about 1 nm (nanometer) to about 1 $\mu$m. The preferred thickness of the adhesive layers 201 is dependent upon factors similar to those enumerated above for tilt-limiting layer 200.

In one embodiment, the adhesive layers 201 are deposited by physical vapor deposition (PVD), such as by a sputtering process. In another embodiment, the adhesive layers 201 are deposited by chemical vapor deposition (CVD), such as plasma enhanced chemical vapor deposition (PECVD). In another embodiment, the adhesive layers 201 are deposited by ion beam deposition.

In one embodiment, the shaft 134 may be etched prior to depositing the adhesive and tilt-limiting layers. In the case where no adhesive layer is deposited, the shaft 134 may be etched prior to depositing the tilt-limiting layer. The shaft 134 may be etched, for example, by a plasma etching process. The plasma etching process may comprise bombarding the substrate with ions of an inert gas such as, for example, argon (Ar).

EXAMPLE 1

A tilt-limiting layer was deposited on a steel shaft of a spindle motor. The tilt-limiting layer comprised diamond-like-carbon. The tilt-limiting layer was deposited by a sputtering process, in which an inert gas sputtered material from a diamond-like-carbon target. A tilt-limiting layer having a thickness of about 1.2 $\mu$m to about 1.4 $\mu$m was deposited.

While foregoing is directed to the preferred embodiment of the present invention, other and further embodiments of the invention may be devised without departing from the basic scope thereof, and the scope thereof is determined by the claims that follow.

What is claimed is:

1. A disc drive storage system, comprising:
    a housing having a central axis;
    a stationary member that is fixed with respect to the housing and coaxial with the central axis;
    a stator fixed with respect to the housing;
    a rotatable member that is rotatable about the central axis with respect to the stationary member;
    a rotor supported by the rotatable member and magnetically coupled to the stator;
    at least one data storage disc attached to and coaxial with the rotatable member;
    an actuator supporting a head proximate to the data storage disc for communicating with the disc; and
    a hydrodynamic bearing interconnecting the stationary member and the rotatable member, the bearing having at least a portion of one working surface comprising a tilt-limiting layer, wherein the tilt-limiting layer has a thickness sufficient to limit tilting between the working surfaces of the bearing.

2. The disc drive storage system of claim 1 wherein the tilt-limiting layer comprises a material that improves the hardness of the working surface of the bearing.

3. The disc drive storage system of claim 1 wherein the tilt-limiting layer reduces the coefficient of friction of the working surface of the bearing.

4. The disc drive storage system of claim 1 wherein the tilt-limiting layer comprises a material selected from the group consisting of diamond-like-carbon, hydrogenated diamond-like-carbon, nitrogenated diamond-like-carbon, nickel phosphide (NiP), nickel boride (NiB), and combinations thereof.

5. The disc drive storage system of claim 1 wherein the tilt-limiting layer is formed on an adhesive layer.

6. The disc drive storage system of claim 1 wherein the adhesive layer comprises one or more material selected from the group consisting of chromium (Cr), silicon (Si), titanium (Ti), zirconium (Zr), and silicon carbide (SiC).

7. The disc drive storage system of claim 6 wherein the adhesive layer has a thickness in a range of about 1 nanometer to about 1 micrometer.

8. A motor, comprising:
 a housing having a central axis;
 a stationary member that is fixed with respect to the housing and coaxial with the central axis;
 a stator fixed with respect to the housing;
 a rotatable member that is rotatable about the central axis with respect to the stationary member;
 a rotor supported by the rotatable member and magnetically coupled to the stator; and
 a hydrodynamic bearing interconnecting the stationary member and the rotatable member, the bearing having at least a portion of one working surface comprising a tilt-limiting layer,
 wherein the tilt-limiting layer has a thickness sufficient to limit tilting between the working surfaces of the spindle motor.

9. The motor of claim 8 wherein the tilt-limiting layer comprises a material that improves the hardness of the working surface of the bearing.

10. The motor of claim 8 wherein the tilt-limiting layer reduces the coefficient of friction of the working surface of the bearing.

11. The motor of claim 8 wherein the tilt-limiting layer comprises a material selected from the group consisting of diamond-like-carbon, hydrogenated diamond-like-carbon, nitrogenated diamond-like-carbon, nickel phosphide (NiP), nickel boride (NiB), and combinations thereof.

12. The motor of claim 8 wherein the tilt-limiting layer is formed on an adhesive layer.

13. The motor of claim 12 wherein the adhesive layer comprises one or more material selected from the group consisting of chromium (Cr), silicon (Si), titanium (Ti), zirconium (Zr), and silicon carbide (SiC).

14. The motor of claim 12 wherein the adhesive layer has a thickness in a range of about 1 nanometer to about 1 micrometer.

15. A motor, comprising:
 a hydrodynamic bearing interconnecting a stationary member and a rotatable member, wherein the hydrodynamic bearing has at least one working surface; and
 a portion of the at least one working surface has a tilt-limiting means layer disposed thereon, wherein the tilt-limiting layer has a thickness sufficient to limited tilting between the working surfaces of the hydrodynamic bearing.

16. The motor of claim 15 wherein the tilt-limiting means comprises a material that improves the hardness of the working surface of the bearing.

17. The motor of claim 15 wherein the tilt-limiting means reduces the coefficient of friction of the working surface of the bearing.

* * * * *